US010203878B2

United States Patent
Haller et al.

(10) Patent No.: US 10,203,878 B2
(45) Date of Patent: *Feb. 12, 2019

(54) NEAR MEMORY ACCELERATOR

(71) Applicant: International Business Machines Corporation, Armonk, NY (US)

(72) Inventors: Angelo Haller, Brandenburg (DE); Harald Huels, Horb am Neckar (DE); Jan Van Lunteren, Gattikon (CH); Joerg-Stephan Vogt, Holzgerlingen (DE)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/859,372

(22) Filed: Dec. 30, 2017

(65) Prior Publication Data

US 2018/0284994 A1 Oct. 4, 2018

Related U.S. Application Data

(63) Continuation of application No. 15/471,372, filed on Mar. 28, 2017.

(51) Int. Cl.
*G06F 12/00* (2006.01)
*G06F 3/06* (2006.01)
*G06F 12/02* (2006.01)

(52) U.S. Cl.
CPC ............ *G06F 3/0607* (2013.01); *G06F 3/068* (2013.01); *G06F 3/0631* (2013.01);
(Continued)

(58) Field of Classification Search
None
See application file for complete search history.

(56) References Cited

U.S. PATENT DOCUMENTS 9,971,701 B2 * 5/2018 Albot .................. G06F 12/1009
2007/0169059 A1 7/2007 Halambi et al.
(Continued)

OTHER PUBLICATIONS

Coherent Accelerator Processor Interface User's Manual, IBM, version 1.2, Jan. 29, 2015 (Year: 2015).*
(Continued)

*Primary Examiner* — Brian R Peugh
*Assistant Examiner* — Jason W Blust
(74) *Attorney, Agent, or Firm* — Daniel P. Morris; Otterstedt, Ellenbogen & Kammer, LLP

(57) ABSTRACT

A computing system includes a host processor, an access processor having a command port, a near memory accelerator, and a memory unit. The system is adapted to run a software program on the host processor and to offload an acceleration task of the software program to the near memory accelerator. The system is further adapted to provide, via the command port, a first communication path for direct communication between the software program and the near memory accelerator, and to provide, via the command port and the access processor, a second communication path for indirect communication between the software program and the near memory accelerator. A related computer implemented method and a related computer program product are also disclosed.

3 Claims, 5 Drawing Sheets

US 10,203,878 B2

Page 2

(52) U.S. Cl.
CPC ......... *G06F 3/0659* (2013.01); *G06F 12/023* (2013.01); *G06F 2212/1044* (2013.01)

(56) References Cited

U.S. PATENT DOCUMENTS

| | | | |
|---|---|---|---|
| 2012/0254587 A1* | 10/2012 | Biran .................. | G06F 9/3877 712/34 |
| 2015/0121037 A1 | 4/2015 | Van Lunteren | |
| 2016/0077577 A1 | 3/2016 | Van Lunteren et al. | |
| 2016/0132241 A1 | 5/2016 | Perego et al. | |
| 2018/0095750 A1* | 4/2018 | Drysdale .............. | G06F 9/3005 |

OTHER PUBLICATIONS

Qi Guo et al. "3D-stacked memory-side acceleration: Accelerator and system design". Proc. Workshop on Near Data Processing (WONDP), 2014. pp. 1-6.

Amin Farmahini-Farahani et al. "DRAMA: An Architecture for Accelerated Processing Near Memory". IEEE Computer Architecture Letters (vol. 14, Issue: 1) Jun. 30, 2014. pp. 1-4.

Angelo Haller, et al., unpublished U.S. Appl. No. 15/471,372, filed Mar. 28, 2017, Near Memory Accelerator, pp. 1-25 plus 5 sheets of drawings.

Paul J. Otterstedt, List of IBM Patents or Patent Applications Treated as Related, Aug. 30, 2018, pp. 1-2.

* cited by examiner

NEAR MEMORY ACCELERATOR

CROSS-REFERENCE TO RELATED APPLICATIONS

This application is a continuation of U.S. patent application Ser. No. 15/471,372 filed Mar. 28, 2017, the complete disclosure of which is expressly incorporated herein by reference in its entirety for all purposes.

BACKGROUND

In von-Neumann machines a central processor (CPU=central processing unit or GPU=graphics processing unit) may employ several mechanisms to overcome the so called "Memory Wall", which is a term to denote the growing performance gap between ever faster processors and comparably slower memory technologies. These mechanisms are in particular focused on tolerating longer access latencies of the main memory system in order to minimize the time that the processor's execution units are stalled. Or in other words: to maximize the utilization of the execution unit(s).

One of the most important feature of these mechanisms is the use of a memory hierarchy comprising multiple levels of fast caches. Other mechanisms include support for out-of-order execution of instructions and multi-threading which both allow to continue processing with different instructions and/or threads when certain instructions or threads have been stalled while waiting for data to arrive from the memory system.

Another example of a mechanism to reduce the (average) access latency is a prefetching of data from the memory system.

In recent years, Field Programmable Gate Array (FPGA) technology continued to grow in importance as one of multiple programmable off-the-shelf accelerator technologies that can be used to improve performance and optimize power for selected application domains.

SUMMARY

According to a first aspect, the invention is embodied as a computing system comprising a host processor, an access processor having a command port, a near memory accelerator; and a memory unit. The system is adapted to run a software program on the host processor and to offload an acceleration task of the software program to the near memory accelerator. The system is further adapted to provide, via the command port, a first communication path for direct communication between the software program and the near memory accelerator and to provide, via the command port and the access processor, a second communication path for indirect communication between the software program and the near memory accelerator.

According to an embodiment of another aspect of the invention a computer implemented method is provided for operating a computing system according to the first aspect. The method comprises steps of running a software program on the host processor and offloading an acceleration task of the software program to the near memory accelerator. The method comprises further steps of providing, via the command port, a first communication path for direct communication between the software program and the near memory accelerator and a second communication path for indirect communication between the software program and the near memory accelerator via the access processor.

Another aspect of the invention relates to a computer program product for operating a computing system. The computing system comprises a host processor, an access processor having a command port, a near memory accelerator and a memory unit. The computer program product comprises a computer readable storage medium having program instructions embodied therewith. The program instructions are executable by the computing system to cause the computing system to perform a method comprising running a software program on the host processor and offloading an acceleration task of the software program to the near memory accelerator. The method further comprises providing, via the command port of the access processor, a first communication path for direct communication between the software program and the near memory accelerator and a second communication path for indirect communication between the software program and the near memory accelerator via the access processor.

Embodiments of the invention will be described in more detail below, by way of illustrative and non-limiting examples, with reference to the accompanying drawings.

DETAILED DESCRIPTION

Figure 1:
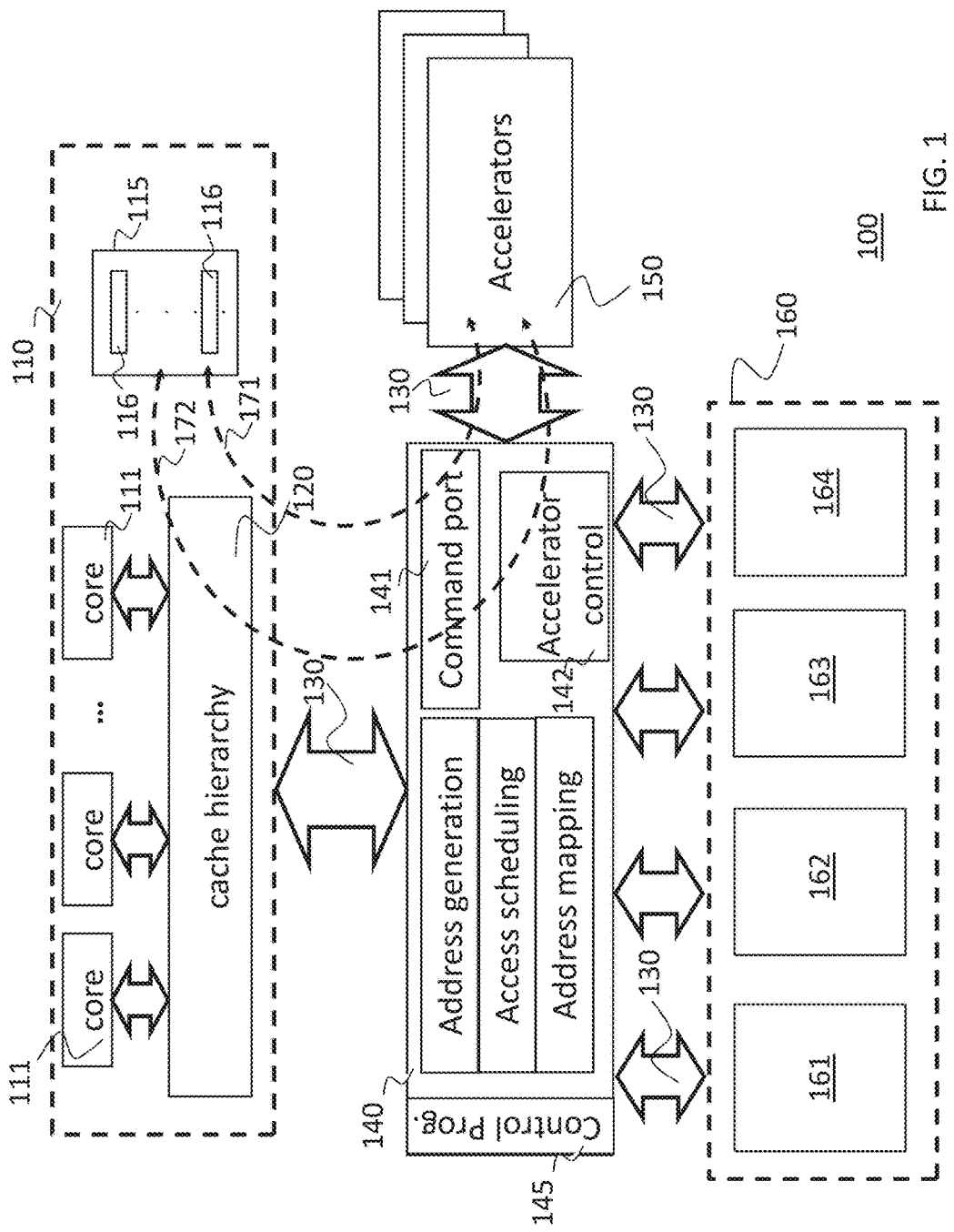
FIG. 1 shows a block diagram of a computing system according to an embodiment of the invention.

In reference to FIGS. 1-5, some general aspects and terms of embodiments of the invention are described.

In the context of this description, the following conventions, terms and/or expressions may be used:

The term "access processor" may denote a dedicated processor for address generation, address mapping and access scheduling as well as accelerator control. In contrast to a classical general purpose processor, the access processor may be tightly integrated with, and be part of a memory unit. The access processor may be optimized to access one or more memory banks of the memory unit, typically in an interleaved fashion, to maximize the memory bandwidth utilization. Data retrieved from those memory banks may then be transferred over to the near memory accelerator. The memory access—in form of read and write accesses—and the bus and/or interconnect transfers may be scheduled in a combined fashion by the access processor. The access processor is programmable and may be programmed or pre-programmed with a predefined control program.

The term "memory unit" may denote a memory of the computing system which may be organized in particular in memory banks. The memory unit may comprise e.g. DRAM memory cells. However, other technologies, e.g., SRAM or memristors, may also be used. The memory unit may be in particular embodied as Dual Inline Memory Module (DIMM).

The term "near memory accelerator" may denote a hardware unit, e.g. an application specific integrated circuit (ASIC) or a field programmable gate array (FPGA), that is configured or configurable to perform specific computation tasks. The computation tasks may be in particular computation tasks that are highly repetitive and that can be performed advantageously and quicker by a specialized hardware circuit. The access processor may also denote a (small) programmable processor unit that may be programmed to perform specific computation tasks.

The term "field programmable gate array" (FPGA) may denote an integrated hardware circuit designed to be configured for one or more computing tasks by a system designer after manufacturing—hence "field-programmable". The one or more FPGA configurations may be generally specified using a hardware description language (HDL) and may have large resources of logic gates and RAM blocks to implement complex digital computations.

The term "operand data" may denote data that shall be processed by the near memory accelerator according to embodiments of the invention. The operand data may comprise the data itself that shall be processed as well as address data indicating addresses of the memory unit where the data that shall be processed is stored. Furthermore, the term "operand data" includes an operand data identifier. Such an operand data identifier may indicate the respective acceleration task that shall be performed on the operand data by the near memory accelerator.

The term "configuration data" may denote data that shall be used to configure the near memory accelerator for a specific function or computing task. The configuration data may comprise data for configuring a near memory accelerator that is implemented in an ASIC, for example, by writing parameters into configuration registers that are part of the near memory accelerator. The configuration data may also comprise data, e.g., a bitstream, for configuring an FPGA to implement a near memory accelerator or it may comprise data, e.g., a bitstream, for partial configuration of an FPGA involving the configuration of one or multiple FPGA partitions, to implement a near memory accelerator. The configuration data for a near memory accelerator implemented using an FPGA may also include configuration parameters that are written into configuration registers that are part of the near memory accelerator after a configuration bitstream, that is also part of the configuration data, has been used to configure the FPGA.

The term "address generation" may denote the generation of addresses by the predefined control program running on the access processor. The address space used for the address generation may be in particular a linear address space.

The term "address mapping", sometimes also referred to as address translation, may denote the mapping of the addresses generated by the predefined control program running on the access processor upon the physical storage locations of the memory unit. As an example, mapping tables may be used to map/translate the addresses generated by the control program running on the access processor into identifiers to select a memory bank within the memory unit, and identifiers to select a row and a column within a DRAM array comprising the selected bank, to store and retrieve data. The unit that typically handles this specific translation/mapping is often known as the memory controller. According to embodiments of the invention the access processor controls/performs this translation/mapping. According to embodiments, a mapping table may map generated addresses on bank identifiers and offsets in the respective bank.

The term "access scheduling" may denote the scheduling of data retrieval/read operations and data storage/write operations. Access scheduling is typically performed by a memory controller and according to embodiments of the invention by the access processor. The access scheduling function of the access processor according to embodiments of the invention may control and determine in particular the sequence of memory accesses to the memory unit for a given queue of read/write requests, and the timing at which these are executed.

The term "memory bank" may denote a logical unit of the memory unit. A memory bank may comprise a plurality of rows and columns of storage units. In a single read or write operation, only one memory bank may be accessed.

The term memory access bandwidth may denote the rate at which data can be retrieved from or stored into a memory unit. Memory access bandwidth may be e.g. expressed in units of bytes/second. The memory access bandwidth is usually not fixed and depends on the type and pattern of data accesses. The memory access bandwidth can be influenced and/or controlled by a memory controller and according to embodiments of the invention by the access processor respectively. Memory bandwidth that is advertised for a given memory unit or memory system is usually the maximum theoretical bandwidth. As an example, the access scheduling function of the access processor may e.g. increase the memory access bandwidth that is available at a given moment in time, by scheduling multiple accesses that are directed to different memory banks and consequently can be performed in parallel, and/or by leaving pages open for subsequent accesses to the same page.

A computing system according to embodiments of the invention may provide a plurality of advantages:

The access processor and the near memory accelerator may be located physically very close to or inside the memory unit. Operand data that shall be processed using the near memory accelerator may be transferred over a much shorter distance compared to a traditional processor/memory architecture.

According to embodiments, the access processor may be deeply integrated into the memory unit and exposed to full memory details like cycle times, bank organization and retention times. Basic operations of the memory unit are controlled by the access processor including address generation, access scheduling, address mapping and page open/close commands. Flexible address mapping in combination with address generation enables efficient interleaving over memory banks and memory lines.

Consequently, data processing is moving close to the memory unit. This allows also an adaptation of the operation of the memory unit to the respective application.

The proposed computing system may be implemented in particular for applications that involve low locality of reference characteristics, and, consequently, for which conventional cache hierarchies do not perform well. The latter requires that most data has to be retrieved and transferred "all the way" from the main memory system to the processor. Performing the data processing close to the memory unit, can substantially reduce the distance over which data has to be transferred for this type of applications, and, as a result, can substantially improve the power efficiency.

FIG. 1 shows a block diagram of a computing system 100 according to an embodiment of the invention. The computing system 100 comprises a host processor 110. The host processor 110 has a plurality of processing cores 111. The host processor 110 comprises furthermore a cache system 120 comprising a plurality of caches arranged in a cache hierarchy. The host processor 110 is communicatively coupled with a programmable access processor 140 via an interconnect system 130. The interconnect system 130 may be e.g. a DMI memory bus.

The access processor 140 comprises a predefined control program 145 which may be e.g. pre-loaded.

The computing system 100 comprises one or more near memory accelerators 150. The near memory accelerators 150 may be e.g. an application specific integrated circuit (ASIC) or a field programmable gate array (FPGA) which are configured or configurable to perform specific computation tasks. Each near memory accelerator 150 may also be implemented using a partition of an FPGA that can be configured partially and dynamically, without affecting the operation of the functions, for example, of other near memory accelerators in the remaining part of the FPGA. The computation tasks may be in particular computation tasks that are highly repetitive and that can be performed advantageously and quicker by the near memory accelerators than by the host processor 110.

The computing system 100 comprises a memory unit 160 having a plurality of memory banks, in this example a first memory bank 161, a second memory bank 162, a third memory bank 163 and a fourth memory bank 164.

The access processor 140 is adapted to execute the predefined control program 145 and perform address generation, address mapping and/or access scheduling for memory accesses of the host processor 110 and the near memory accelerators 150.

The host processor 110 may run one or more software programs 115. The software programs 115 may comprise one or more accelerations tasks 116.

The host processor 110 may use the near memory accelerators 150 to offload the accelerations tasks 116 which are specific computation tasks. The offloaded acceleration tasks 116 may be in particular computation tasks that are highly repetitive and that can be performed advantageously and quicker by specialized hardware circuits, in particular by FPGAs, which are particularly configured for the respective computation tasks.

The access processor 140 comprises a command port 141. The command port 141 serves as communication port for a communication between the software program 115 running on the host processor 110, the access processor 140 and the near memory accelerator 150.

More particularly, the system 100 provides a first communication path 171 between the software program 115 and the near memory accelerator 150 via the command port 141. Furthermore, the system 100 provides a second communication path 172 between the software program 115 and the near memory accelerator 150 via the command port 141 and the access processor 140. The first communication path 171 establishes a direct communication path, while the second communication path 172 establishes an indirect communication path between the software program 115 and the near memory accelerator 150.

The first communication path 171 may be established by writing, by the software program 115 executed on the host processor 110, operand and/or control data of the acceleration task 116 to the command port 141, that is then read by the near memory accelerator 150 directly from the command port 141, and by writing, by the near memory accelerator 150, result data of the acceleration task 116 directly to the command port 141, which is then read by the software program 115 executed on the host processor 110.

Accordingly, the command port 141 is configured to serve as central and shared offload communication port between the software program 115, the access processor 140 and the near-memory accelerator 150. This facilitates interaction between the software program 115 running on the host processor 110 and the near-memory accelerator 150 and provides a dual channel for communication between the software program 115 and the near memory accelerator 150.

Operand data may include arguments and parameters of the accelerations task and the type of the acceleration task. The operand data as well as the result data may encompass address data comprising addresses of operand data that shall be processed. According to embodiments the operand data may comprise an operand data identifier for indicating the acceleration task/type of acceleration to be performed on the operand data.

The direct communication channel 171 is in particular useful for providing small amounts of parameter data of the acceleration tasks 116 to the accelerator 150 at the start of its operation, and to provide small amounts of result data directly from the accelerator 150, at the end of its operation to the command port 141. The parameter data and the result data may typically comprise a total size of few bytes to a few cache lines. As an example, the direct communication channel 171 could be used by the software program 115 to specify a count value as parameter data to define how many times the near memory accelerator 150 has to repeat a certain operation. If the near memory accelerator 150 supports multiple functions, for example, determining the minimum, the maximum, or the average of a set of data elements, then the direct communication channel 171 may be used by the software program 115 to select one or multiple of these functions that the near memory accelerator 150 should apply. Similarly, if there are multiple near memory accelerators available, then the direct communication channel 171 may be used to select one or multiple of these near memory accelerators that shall be used for performing the respective acceleration tasks 116. In a similar way, the near memory accelerators 150 may use the direct communication channel 171 to provide short results, execution status and performance data back to the software program 115. This can, for example, include the minimum, maximum, or average value that a near memory accelerator 150 has determined for a set of data elements, one or multiple bit flags indicating that a near memory accelerator 150 has completed its operation, or the total execution time, for example expressed by the number of clock cycles, that the near memory accelerator 150 needed to perform the acceleration task 116.

The second communication path 172 may be established by writing, by the software program 115 executed on the host processor 110, operand and/or control data related to the acceleration task 116 to the command port 141, that is then read from the command port 141 by the access processor 140, and, in response, the access processor 140 then may interact directly with the near memory accelerator 150 by providing operand, control and configuration data and by receiving result data.

Furthermore, the access processor 140 may write result data into the command port 141, for example when the execution of the acceleration task 116 has been completed, which is then read by the software program 115 executed on the host processor 110. According to embodiments, result data may encompass processing results, performance data and/or completion data, the latter e.g. indicating that a respective acceleration task has been completed successfully.

The second indirect communication path 172 is in particular useful for acceleration tasks 116 that involve parameter data and result data that exceed the storage capacity of the command port 141, and therefore are retrieved from, respectively stored in the memory unit 160, under control of the access processor 140. Another useful application of the second indirect communication path 172 is for acceleration tasks 116 that involve multiple processing stages, each of which requires fast reconfiguration of the near memory accelerator 150 including the transfer of parameters/configuration data from the memory unit 160, and/or the transfer of intermediate operand data and intermediate results to and from the memory unit 160. According to embodiments the access processor 140 is directly attached to the near memory accelerators 150 and according to further embodiments at close proximity. Hence it can react much faster to changes in the processing status of the near memory accelerators 150 compared to the host processor 110. Consequently, the access processor 140 has detailed control at fine granularity over the scheduling of the transfer of configuration, operand, and result data to and from the near memory accelerators 150, the access to this data in the command port 141 and in the memory unit 160, and the start of the processing of this data by the near memory accelerators 150, which enables to optimize the system performance and power efficiency.

The second communication path 172 may involve in particular processing and control by an accelerator control unit 142 of the access processor 140. The accelerator control unit 142 may be e.g. configured to read operand data of the respective acceleration task 116 from the command port 141 and to provide this operand data of the acceleration task 116 to the near memory accelerator 150. The operand data may include arguments and parameters of the accelerations task 116 and the type of the acceleration task 116. Furthermore, the operand data as well as the result data encompass address data comprising addresses of operand data that shall be processed. Accordingly, the accelerator control unit 142 may be configured to coordinate and control read and write operations from/to the memory unit 160. In addition, the accelerator control unit 142 may be configured to receive result data of the acceleration tasks 116 from the near memory accelerator 150 and to write result data of the acceleration tasks 116 to the command port 141. The latter may also involve read/write operations to/from the memory unit 160.

Furthermore, the accelerator control unit 142 may be configured to provide configuration data to the near memory accelerator 150 for configuring the near memory accelerator 150 for the respective acceleration task 116. The accelerator control unit 142 may retrieve the configuration data from the memory unit 160. Accordingly, the accelerator control unit 142 may be configured to coordinate and control read and write operations from/to the memory unit 160 for retrieving configuration data and/or operand data and for writing result data.

According to an embodiment the accelerator control unit 142 may be embodied as a state machine. According to such an embodiment the access processor 140 runs the control program 145 on the state machine, provides operand data of the command port 141 to the state machine and selects, in dependence on the operand data, an execution path of the control program 145 for interaction with the near memory accelerator(s) 150.

The memory unit 160 may store operand data, result data and configuration data. The operand data comprises data that shall be processed by one or more of the near memory accelerators 150. In addition, the memory unit 160 is adapted to store the processing results of the operand data. In other words, once the computing task has been performed on the operand data by the near memory accelerators 150, the results of these executed computing tasks may be stored as processing results in the memory unit 160. The configuration data may be used to configure the near memory accelerators 150 for a specific computation or acceleration task.

According to a preferred embodiment, the access processor 140 is adapted to map the configuration data and/or the operand data over the plurality of memory banks, i.e. in this example over two or more of the memory banks 161-164.

The access processor 140, the near memory accelerators 150 and the memory unit 160 may be also coupled via the interconnect system 130. The interconnect system 130 may comprise e.g. dedicated links using packetized protocols for data transfer or it might be embodied as system bus. The interconnect system 150 may support the functions of a data bus to carry and transfer data, in particular the operand data and the configuration data, between the access processor 140, the near memory accelerators 150 and the memory unit 160. Furthermore, the interconnect system 130 may support the function of an address bus to address the respective location of the operand and configuration data for retrieval/read operations as well as for storage/write operations. In addition, the interconnect system 150 may provide the function of a control bus to control the retrieval/read operations as well as the storage/write operations.

The programmable access processor 140 has full control over all the basic memory operations of the memory unit 160 and acts as a master device for the memory unit 160 as well as for the near memory accelerators 150. In particular, in contrast to a conventional memory controller, the access processor 140 also performs the address generation for the retrieval/read operations as well as for the storage/write operations of the configuration data, the result data and the operand data for the near memory accelerators 150, and it may also do this for the host processor 110. By performing all three functions, namely address generation, address mapping and access scheduling for the retrieval/read operations and for the storage/write operations, the access processor 140 has full control over these operations and may use this in several advantageous ways to improve the performance of the computing system 100. In this respect, it should be noted that in conventional systems the address generation for the retrieval/read operations and for the storage/write operations is usually done by the host processor while the address mapping and access scheduling is done by the memory controller. Accordingly in conventional systems the memory controller acts as a slave device of the host processor. On the other hand, the host processor in conventional systems does not perform address mapping and access scheduling which are done by the memory controller.

Allocating the functions of address generation, address mapping and access scheduling in the access processor, provides enhanced flexibility, freedom and functionality to the access processor 140 for optimizing the performance of the computing system 100. Because the access processor is provided detailed information about the memory unit, for example, implemented in its pre-loaded program, it can optimize the utilization of the available memory resources, something that is not possible to do at this level in a conventional system.

In particular, the access processor 140 may optimize according to embodiments of the invention the system level performance and power efficiency of the computing system 100 which are a function of the bandwidth assigned to the retrieval of the configuration data to perform reconfiguration operations on the accelerators 150 and the bandwidth assigned to the retrieval of the operand data that are subsequently processed by one or more of the configured accelerators 150 in the computing system 100. The access processor 140 may do so, by exploiting information on the access patterns, which may be encoded in the predefined control program 145 running on the access processor 140, to organize and store the configuration and/or operand data in the memory unit 160 in an advantageous way that enables accessing the data at optimized levels of performance and power efficiency.

According to a further embodiment, the access processor 140 may optimize the system level performance and power efficiency by distributing the configuration data and/or operand data over multiple banks in the memory unit 160, such that based on the access patterns to that configuration data and/or operand data, the corresponding access operations are interleaved over multiple banks, thus, optimizing the utilization of the available access bandwidth. If the memory unit 160 is embodied in SDRAM technology, the access processor 140 may concentrate and map configuration and/or operand data that will be accessed successively, into consecutive storage locations in the same rows or pages in the SDRAM circuits from which the memory unit 160 is constructed, that can be efficiently accessed in a so called burst mode. Based on the access patterns, the access processor 140 may control the activation and closing of the rows or pages in the SDRAM circuits to minimize the access latency and optimize the power efficiency. The access processor 140 may according to embodiments also control the refresh operation for the various storage locations in the SDRAM circuits, taking into account the access patterns to the individual data elements stored in those storage locations and the data retention time of the SDRAM circuits, which may be encoded in the predefined control program 145 executed by the access processor 140, in order to minimize the access latency and improve the power efficiency by minimizing the number of refresh operations and/or optimizing the scheduling of the refresh operations.

Figure 2:
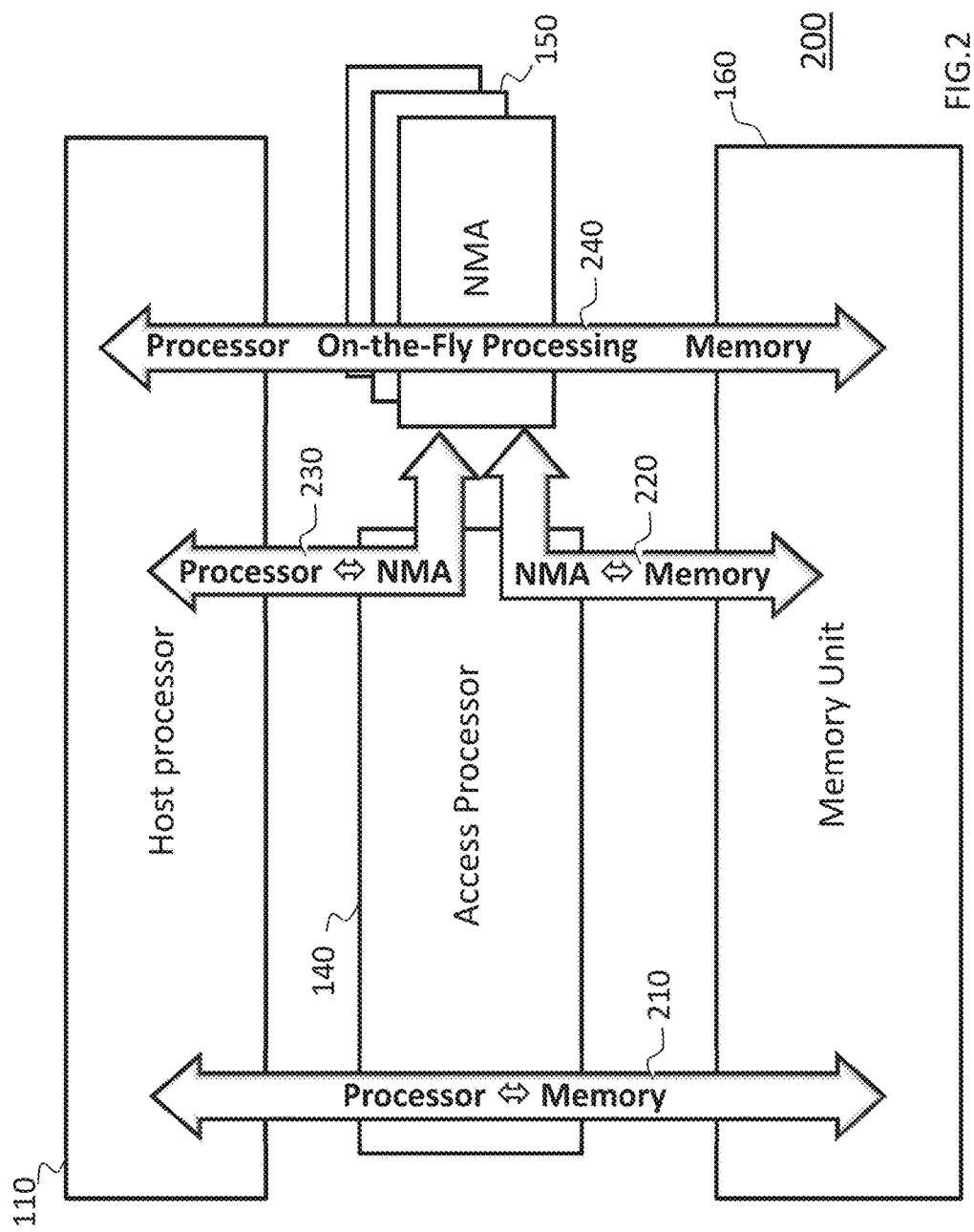
FIG. 2 illustrates various access flows between a host processor, an access processor, a near memory accelerator and a memory unit according to an embodiment of the invention.

FIG. 2 illustrates various access flows between the host processor 110, the access processor 140, the near memory accelerator(s) 150 and the memory unit 160. More particularly, the two communication paths 171 and 172 as illustrated in FIG. 1 allow to setup these various access flows. A basic access flow 210 comprises memory accesses from the host processor 110 to the memory unit 160 that are standard in conventional computer architectures, and which are scheduled and address-mapped by the access processor 140.

A further access flow 220 between the near-memory accelerators 150 and the memory unit 160 comprises accesses from the near-memory accelerators 150 to the memory unit 160 that are performed under control of the access processor 140 to provide configuration and operand data to the near memory accelerators 150 that is retrieved from the memory unit 160, and to store result data from the near memory accelerators 150 in the memory unit 160. This access flow 220 may be setup as described above using the two communication paths 171 and 172.

Another access flow 230 comprises memory accesses from the host processor 110 to the near memory accelerators 150. In this case, the host processor 110 performs accesses to the memory unit 160, in the conventional way. However, the access processor 140 and the near memory accelerators 150 are programmed and/or configured such that selected accesses from the host processor 110, for example based on a virtual or physical address range, are directed by the access processor 140, for example by the address mapping function illustrated in FIG. 1, to the near memory accelerators 150, which will process these accesses. Processing results are provided back to the host processor 110 in the same way as data is retrieved from the memory unit 160 in case of read accesses. This access flow 230 is in particular useful for implementing functions that involve a special type of cache operation possibly in combination with data processing functions that are both implemented by the near memory accelerators 150.

Access flow 240 comprises memory accesses from the host processor 110 to the memory unit 160, that are on-the-fly processed by the near memory accelerators 150. In this case, the host processor 110 performs accesses to the memory unit 160, in the conventional way. However, similar as with access flow 230, the access processor 140 and the near memory accelerators 150 are programmed and/or configured such that selected accesses from the host processor 110, for example based on a virtual or physical address range, are directed by the access processor 140, for example by the address mapping function illustrated in FIG. 1, to the near memory accelerators 150, which will process these accesses. These accesses, however, are forwarded by the memory accelerators 150 through the access processor 140 to the memory unit 160. The forwarded accesses may be the same as the original accesses dispatched by the host processor 110, or may be altered by the near memory accelerators 150, for example, the addresses or data may have been modified by the near memory accelerators 150. In case of read accesses, the retrieved data from the memory unit 160, may also be redirected to the near memory accelerators 150 by the access processor 140, and be forwarded to the host processor 110 with or without modification by the near memory accelerators 150. The access flow 240 is in particular useful for implementing on-the-fly operations on a stream of data that is being written from the host processor 110 into the memory unit 160 or retrieved from the memory unit 160 by the host processor 110, without the need to temporarily store that data for processing. Examples of on-the-fly operations include determining the minimum, the maximum, or the average value of a sequence of data elements, and the calculation or verification of an error detecting and/or correcting code, for example a cyclic redundancy check (CRC) code, over a sequence of data values.

Figure 3:
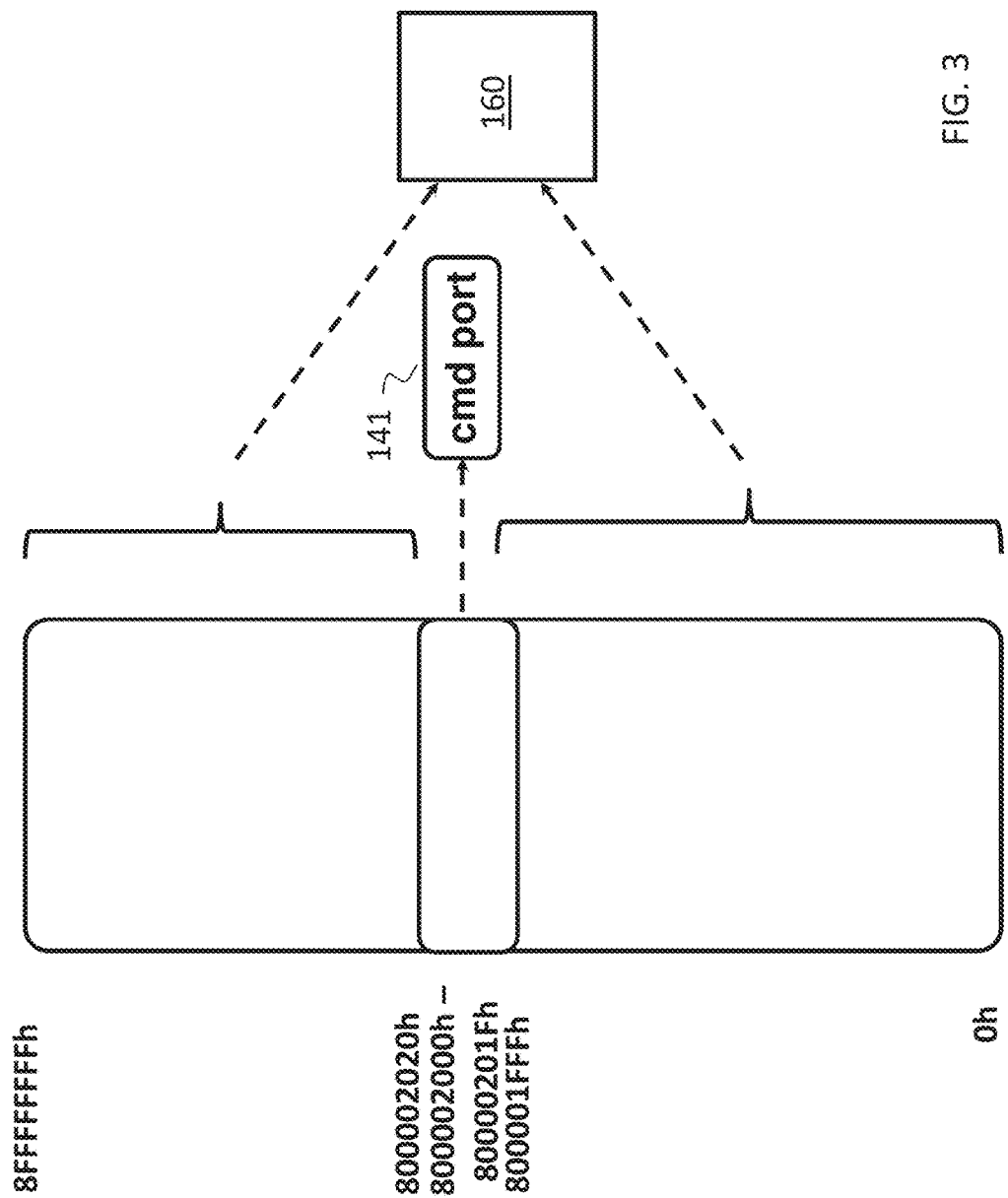
FIG. 3 illustrates an address mapping scheme according to which a command port of an access processor is mapped on an address range of a host processor.

FIG. 3 illustrates an address mapping scheme according to which the command port 141 of the access processor 140 is mapped on an address range of the host processor 110.

More particularly, the command port 141 is mapped as part of the virtual or physical address space that can be accessed by the host processor 110. The command port 141 may be accessed using standard memory accesses. The command port 141 has an initial address, which is 800002000h in FIG. 3, and an end address, which is 80000201Fh in FIG. 3. Accordingly, byte addresses 800002000h-80000201Fh are mapped on the command port 141.

If an address is within the above-mentioned range from 800002000h-80000201Fh, the address mapping function of the access processor 140 will redirect all corresponding accesses to the command port 141, while accesses to other addresses will be performed on the memory unit 160. The command port 141 may include a field that allows the host processor 110 to alter the address of the command port 141 dynamically.

Hence, according to embodiments of the invention, the command port 141 may be implemented as memory mapped register file that is mapped on a predefined address range of an address space of the host processor 110.

According to embodiments, only write accesses may be redirected to the command port 141, while read accesses may be served from the memory unit 160.

According to embodiments, write accesses may be both performed on the command port 141 and the memory unit 160. According to a further embodiment the command port 141 may comprise different register files for read and write accesses. The latter embodiment implies that when data is written into the command port 141, it cannot be retrieved by a read command on the same address. Instead, the read command on the same address could provide the processing results back.

According to embodiments, a device driver is provided as an interface for the communication of the software program 115 that is running on the host processor 110 with the access processor 140 and the near memory accelerators 150. The device driver may be responsible for the management of the acceleration tasks 116 and the associated management of the memory regions and/or address ranges that are used to access the command port 141 and exchange operand and result data between the software program 115 and the near memory accelerators 150. The device driver may also be responsible for triggering flush operations on the caches in order to make sure that data is transferred immediately between the software program 115 and the command port 141, the memory system 160, and the near memory accelerators 150.

The operation of the device driver may be based on a file system abstraction, that uses a single file to represent and manage each individual accelerator task 116. The creation of a new accelerator task 116 may be abstracted by creating a new file in a subdirectory that corresponds to a particular accelerator-task type, e.g., Fast Fourier Transforms. Setting the attributes of a file may be used to control the caching of data related to the corresponding accelerator task 116. Other file attributes may be used to activate synchronous or asynchronous behavior. Task parameters may be defined by setting extended file attributes or may be written directly into the file. Memory for a task may be allocated by memory mapping the file into the memory space of the program. Execution of an accelerator task 116 may be started by setting the execute bit of the file. If synchronous behavior is activated, then the execution of an accelerator task 116 may block further calls until the task has completed. If asynchronous behavior is activated, then the call may return and completion may be signaled through the file system. After task completion, processing results may be read from the memory and/or may be read from the file.

Figure 4:
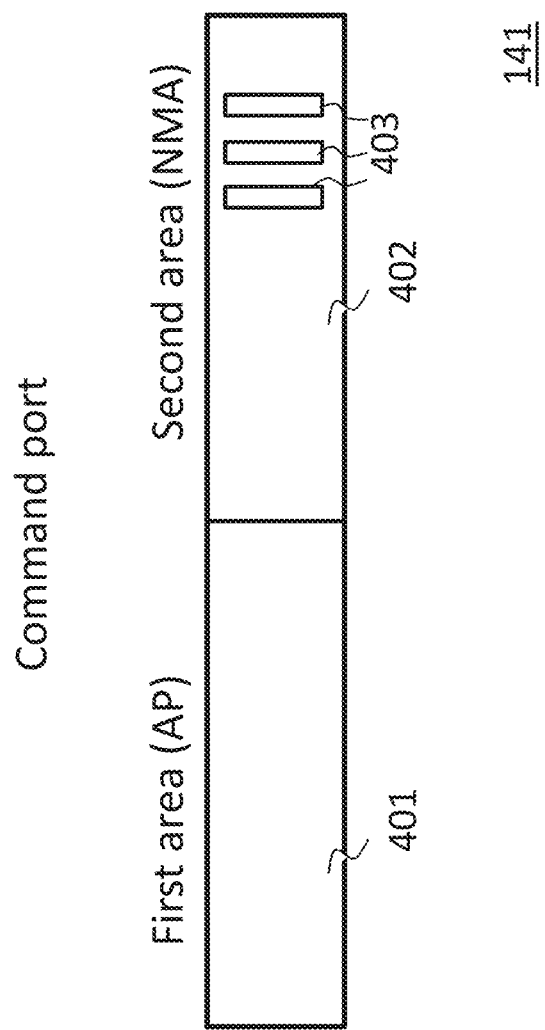
FIG. 4 shows an exemplary embodiment of a command port.

The above file system operations may be translated by the device driver into corresponding actions and accesses to the command port 141. FIG. 4 shows a more detailed illustration of an embodiment of the command port 141. The command port 141 comprises a first area 401 allocated to comprise data for communication of the software program 115 with the access processor 140. Furthermore, a second area 402 is provided that is allocated to comprise data for direct communication of the software program 115 with the near memory accelerator 150. The second area 402 may comprise a plurality of thread areas 403. Each of the thread areas 403 may be allocated to a thread of one of the near memory accelerators 150.

Figure 5:
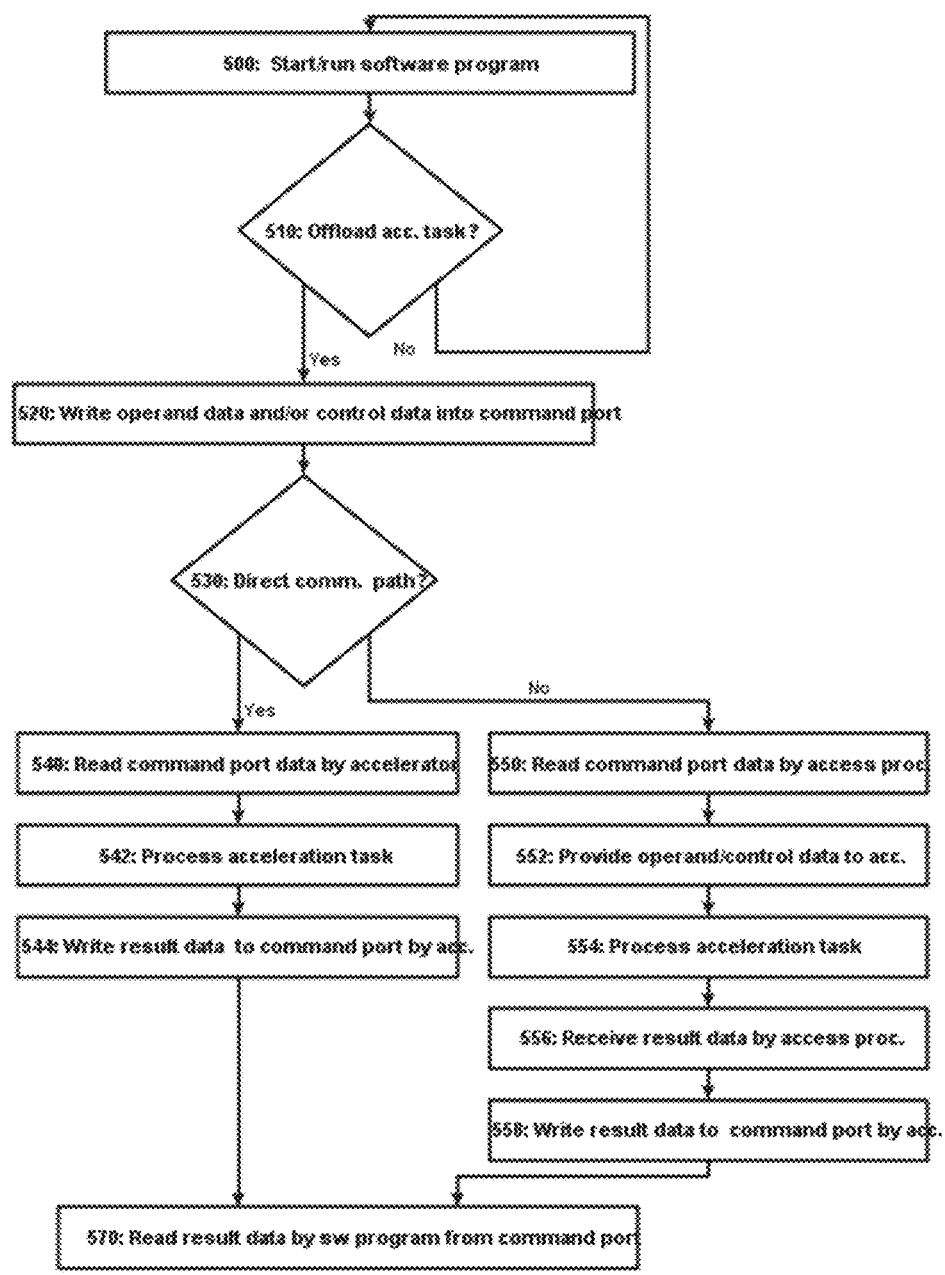
FIG. 5 shows a flow chart of a method according to an embodiment of the invention.

FIG. 5 shows method steps of a computer implemented method for operating a computing system. The computing system may be e.g. the computing system 100 of FIG. 1. At a step 500, the software program, e.g. the program 115 of FIG. 1, is started to run on the host processor 110.

At a step 510, the software program 115 checks whether there is a suitable acceleration task 116 that can be offloaded to the near memory accelerator(s) 150.

If this is not the case, the software program continues its execution. If there is an acceleration task 116 that can be offloaded, then, at a step 520, the host processor 110 writes corresponding operand data and/or control data into the command port 141.

At a step 530, the computing system 100 chooses either the first communication path 171 as direct communication path or the second communication path 172 as indirect communication path.

If the direct communication path 171 is selected, the near memory accelerator 150 reads, at a step 540, the command port data (operand data and/or control data) of the acceleration task 116 directly from the command port 141. Then, at a step 542, the near memory accelerator 150 processes the acceleration task 116. Then, at a step 544, the near memory accelerator 150 writes result data of the acceleration task 116 directly to the command port 141.

If the indirect communication path 172 is selected, the access processor 140 reads, at a step 550, the command port data (operand data and/or control data) of the acceleration task 116 from the command port 141.

Then, at a step 552, the access processor 140 provides the operand data and/or the control data of the acceleration task 116 to the near memory accelerator 150. This usually involves accesses to the memory unit 160. Then, at a step 554, the near memory accelerator 150 processes the acceleration task 116.

At a step 556, the access processor 140 receives result data of the acceleration task 116 and, at a step 558, the access processor 140 writes the result data of the acceleration task 116 to the command port 141. The latter also usually involves accesses to the memory unit 160.

Steps 552, 554 and 556 may be iterated several times, in order to perform multiple (intermediate) processing steps.

Then in both cases, i.e. in case of the first communication path 171 and the second communication path 172, the software program 115 reads, at a step 570, result data of the acceleration task 116 from the command port 141.

Aspects of the invention may be embodied as a computer program product for operating the computing system 100. The computer program product may be embodied as the software program 115 and/or the control program 145. The computer program product comprises a computer readable storage medium having program instructions embodied therewith. The program instructions may be executable by the access processor 140 and/or the host processor 110 to cause the access processor 140 and/or the host processor 110 to perform methods according to embodiments of the invention as described above.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method for operating a computing system, the computing system comprising a host processor, an access processor having a command port, a near memory accelerator and a memory unit; the method comprising the steps of:
running a software program on the host processor;
offloading an acceleration task of the software program to the near memory accelerator;

providing, via the command port, a first communication path for direct communication between the software program and the near memory accelerator and a second communication path for indirect communication between the software program and the near memory accelerator via the access processor;

writing, by the software program, operand data and/or control data of the acceleration task into the command port; and reading, by the software program, result data of the acceleration task from the command port.

2. The computer implemented method according to claim 1, the method further comprising:

reading, by the near memory accelerator, data of the acceleration task directly from the command port; and writing, by the near memory accelerator, data of the acceleration task directly to the command port.

3. The computer implemented method according to claim 1, the method further comprising:

reading, by the access processor, data of the acceleration task from the command port;

providing, by the access processor, the data of the acceleration task to the near memory accelerator;

receiving, by the access processor, data of the acceleration task; and writing, by the access processor, the data of the acceleration task to the command port.

* * * * *